US011771001B2

(12) United States Patent
Kalverkamp et al.

(10) Patent No.: US 11,771,001 B2
(45) Date of Patent: Oct. 3, 2023

(54) METHOD FOR HARVESTING GRAIN CROPS, AND APPARATUS, PROVIDED THEREFOR, FOR A HARVESTER

(71) Applicant: Kalverkamp Innovation GmbH, Rieste (DE)

(72) Inventors: Felix Kalverkamp, Vorden (DE); Klemens Kalverkamp, Damme (DE)

(73) Assignee: Kalverkamp Innovation GmbH, Rieste (DE)

( * ) Notice: Subject to any disclaimer, the term of this patent is extended or adjusted under 35 U.S.C. 154(b) by 641 days.

(21) Appl. No.: 16/760,665

(22) PCT Filed: Oct. 30, 2018

(86) PCT No.: PCT/EP2018/079668
§ 371 (c)(1),
(2) Date: Apr. 30, 2020

(87) PCT Pub. No.: WO2019/086430
PCT Pub. Date: May 9, 2019

(65) Prior Publication Data
US 2020/0344949 A1    Nov. 5, 2020

(30) Foreign Application Priority Data
Nov. 2, 2017   (DE) .......................... 102017125590.7

(51) Int. Cl.
*A01D 41/12* (2006.01)
*A01F 12/44* (2006.01)
(Continued)

(52) U.S. Cl.
CPC ........ *A01D 41/1243* (2013.01); *A01F 12/446* (2013.01); *A01D 41/02* (2013.01); *A01D 41/1208* (2013.01); *A01F 12/46* (2013.01)

(58) Field of Classification Search
CPC ................ A01D 41/1243; A01D 41/02; A01D 41/1208; A01D 41/12; A01F 12/446;
(Continued)

(56) References Cited

U.S. PATENT DOCUMENTS 4,359,058 A * 11/1982 Rusanov ............... A01F 12/442
460/98
2003/0032465 A1* 2/2003 Schwersmann ........... A01F 7/06
460/69
(Continued)

FOREIGN PATENT DOCUMENTS

CN   103313593 A   9/2013
DE      73187      6/1968
(Continued)

OTHER PUBLICATIONS

Google Translation of PCT/EP2018/079668 237 Rejection (Year: 2018).*
(Continued)

*Primary Examiner* — Russell Frejd
(74) *Attorney, Agent, or Firm* — DINSMORE & SHOHL LLP

(57) ABSTRACT

A method and device for harvesting grain crops is provided. A threshing method includes separating grain from harvested material, which is fed to a threshing phase after a gathering process taking place against a direction of working travel. During threshing, the harvested material is processed as the respective grain crops and admixtures in the form of straw and chaff such that essential, dischargeable admixtures are separated from the grain crops, and these, in the form of a mixture with chaff or similar fine particles, are fed as a grain/chaff stream to a final cleaning. The grains free of these residual admixtures are subsequently collected as grain crops. During at least one feed phase preceding the final cleaning, a transport movement is imparted to the at least (Continued)

one grain/chaff stream with the transport movement having a component in a vertical direction and a component in the direction of working travel.

24 Claims, 13 Drawing Sheets

(51) Int. Cl.
*A01D 41/02* (2006.01)
*A01F 12/46* (2006.01)

(58) Field of Classification Search
CPC .......... A01F 12/46; A01F 12/18; A01F 12/44; A01F 12/00; A01F 12/184
See application file for complete search history.

(56) References Cited

U.S. PATENT DOCUMENTS

| | | | | |
|---|---|---|---|---|
| 2003/0066277 A1* | 4/2003 | Behnke | ................ | A01D 41/127 56/10.2 R |
| 2004/0186597 A1* | 9/2004 | Wippersteg | .......... | A01D 41/127 700/31 |
| 2006/0185340 A1 | 8/2006 | Eyre | | |
| 2006/0272307 A1* | 12/2006 | Behnke | ................ | A01D 41/127 56/10.2 R |
| 2007/0005209 A1* | 1/2007 | Fitzner | ................. | A01B 79/005 701/50 |
| 2012/0004813 A1* | 1/2012 | Baumgarten | ........ | A01D 41/127 701/50 |
| 2016/0309656 A1 | 10/2016 | Wilken et al. | | |

FOREIGN PATENT DOCUMENTS

| | | |
|---|---|---|
| DE | 61886 | 6/1970 |
| DE | 3223927 A1 | 12/1983 |
| DE | 3237677 A1 | 4/1984 |
| DE | 209562 | 5/1984 |
| DE | 8603904 U1 | 4/1986 |
| DE | 4405337 A1 | 8/1995 |
| DE | 19523025 A1 | 1/1997 |
| DE | 102008023022 A1 | 11/2009 |
| DE | 102016103204 A1 | 8/2017 |
| EP | 0392189 B1 | 8/1993 |
| EP | 1247442 B1 | 11/2005 |
| EP | 3085221 A1 | 10/2016 |
| RU | 2070373 C1 | 12/1996 |
| SU | 96435 A1 | 11/1952 |

OTHER PUBLICATIONS

International Search Report dated Feb. 1, 2019; International Application No. PCT/EP2018/079668.

* cited by examiner

FIG. 8

METHOD FOR HARVESTING GRAIN CROPS, AND APPARATUS, PROVIDED THEREFOR, FOR A HARVESTER

CROSS REFERENCE TO RELATED APPLICATIONS

This application is the U.S. national stage of PCT/EP2018/079668 filed Oct. 30, 2018, which claims priority of German Patent Application 102017125590.7 filed Nov. 2, 2017 both of which are hereby incorporated by reference in their entirety.

FIELD OF THE INVENTION

The invention relates to a threshing method for the harvesting of grain crops, in particular of cereals as harvested material. The device provided for this purpose is based on the gathering of the harvested material along an area of arable land in a threshing unit, from which residual admixtures are discharged, a grain/chaff stream is fed to a final cleaning unit and the harvested material, in particular grain, is collected.

BACKGROUND OF THE INVENTION

The use of self-propelled combine harvesters has been known for a long time, wherein harvested material in the form of cereals, maize, rape or similar grain crops are separated from the stalks by threshing and straw and chaff are ejected from the system as residual admixtures in the process. A proposal according to DD 73 187 already uses a mowing and feeding device for harvested material, in which two cutting mechanisms are used in the area of the gathering process for the improvement of the harvest performance. A self-propelled version of a combine harvester in accordance with DE 32 23 927 A1 is also directed towards a multi-part structure, wherein the threshing unit consists of at least two threshing and separating drums which can be used with the same or opposite conveying direction. This should make it easier to pick up the threshed straw from the deposited swathe after the collection of the grain.

A further improvement of this system is achieved in accordance with DE 32 37 677 A1, wherein a carrier vehicle to be activated modularly is provided, which in the region of a three-point suspension can detachably accommodate the axial threshing unit, the cleaning device and the cutting mechanism recess. In each case, these components of the system must be arranged in the region in front of the front axle of the combine harvester in order to benefit from the advantages of the interchangeable threshing system.

A combine harvester is known from a publication according to DD 209 562 which has a separator mounted on the cutting mechanism. This is to ensure that the available installation space can be used optimally and that maintenance and repair work can be carried out in a more simple fashion. The system is characterised by the fact that a longitudinal flow threshing unit is incorporated in the cutting mechanism. Provision is made for in the area of the gathering device for the use of two separators located next to each other. This clearly shows the basic design of a unit that gathers the harvested material against the direction of travel and displaces it backwards in the longitudinal direction. In each case, the straw is discharged downwards and, starting from the upstream threshing unit, the grain/chaff mixture can be displaced to the rear into the corresponding separation and sieving unit.

In a further development of the systems described above in accordance with a solution in EP 0 392 189 B1, a combine harvester combined with a carrier vehicle is proposed, wherein here the threshing and separating unit located below the driver's cab and in front of the front wheel axle here gathers the crop in the transverse direction and then transfers it via elevating conveyors into the region of a downstream saddle unit.

Other agricultural harvesting machines are shown in EP 1 247 442 B1 and US 2006/0185340 A1, wherein constructions of the respective threshing unit equipped with interchangeable modules are proposed.

A self-propelled combine harvester which has a directionally adjustable chassis is known from DD 61886. Based on known combine harvester types, it is provided here that the cutting device is aligned in front of the grain tank and, in this connection, the components of threshing and cleaning devices, which interoperate as a known linear system, are arranged above this grain tank. The proposal according to DE 86 03 904 U1 also proposes an overhead system with linear downstream components, wherein the cut grain is fed into the area of the threshing direction by means of an inclined conveyor and under the effect of gravity a separation of the grain ending at a bottom plate with subsequent separate elevation is provided.

SUMMARY OF THE INVENTION

Based on the state of the art, the threshing process according to the invention is aimed at an improved material flow for both the grain crops and the admixtures. In this connection, the harvesting machine, which can be converted from work to road travel with little effort, should have compact dimensions at a maximisable working width, enable a cutting mechanism mount on the chassis to be positioned with optimum load capacity and provide comparatively short material flows both for the filling of a variable hopper volume and for the discharge of the admixtures.

To achieve this object, a threshing method is proposed as shown herein, and a device for this purpose is also shown.

Based on the known threshing methods used during the harvest of grain crops, the harvested material gathered with stalks or stems is fed to a threshing phase after being picked up in the opposite direction to the direction of working travel, during which the harvested material is processed accordingly in the form of grain crops, straw and chaff. In this connection, a generated grain/chaff stream is to be fed to a final cleaning system so that grain crops in the form of cereal grain, maize grain or the like largely free of residual admixtures are collected at the end of the process.

The improved process control according to the invention is aimed at ensuring that during at least one feed phase preceding the known final cleaning, a transport movement deviating from the known "linear" process sequences is imparted to the at least one grain/chaff stream. This system-dependent optimisable transport movement is directed towards a flow guide which now has one component in the vertical direction and one component in the direction of working travel. In contrast to the known "linear" systems with transport movements that are initiated during or at the end of the threshing process, a system is thus realised in which a targeted "deflection" is integrated into the process sequence. A structurally improved harvesting unit can thus be realised on the basis of this stream guide.

In this connection, it is provided that the grain/chaff stream, which is to be displaced in several phases, is guided in a confined space immediately after the threshing phase by means of the transport movements according to the invention and that an "elevation" in the direction of travel is used in this connection. The result of this procedure is that a design relevant length of the conveyor system—and thus the dimensions of the device—which can be defined in the direction of working travel, can be reduced to a minimum. It then follows from this concept that a crop conveyor system with a largely variable width in the direction of working travel can be repositioned transversely to the direction of working travel, thus defining an optimum direction of road travel for the system.

After this positioning in a change-over road travel direction, the system with the optimised grain/chaff guide can be used as a compact unit in public transport, where it can be moved largely independently while maintaining the width dimensions.

Based on the basic considerations described above, the improved threshing method is designed so that the grain/chaff stream to be elevated from the threshing phase—which discharges the straw—can be fed to the final cleaning stage in one or more directions for subsequent discharge of the chaff as residual admixture. In this connection, during cleaning, the grain/chaff stream is guided in the respective axes of movement in or against the direction of working travel.

The configuration of the respective conveying stages of the "deflected" transport movement according to the invention provides that the grain of the grain/chaff stream, which is now conveyed upwards in relation to the gathering and threshing phase and is divided during the final cleaning, is introduced into at least one collecting container located at the top in relation to the gathering process. In this connection, it is provided that the chaff will be removed in one or more transport phases before the grain is discharged into the upper collecting container. Taking advantage of known procedures, it is provided that in this region a combination of wind winnowing and sieving can be used to separate the chaff from the grain/chaff stream.

A variant of the improved threshing method according to the invention provides for the harvested material to be collected in at least two partial mowing paths, starting from a mowing path defining a cutting width with several harvest lines. The harvested material is then fed into separate conveying, threshing and separating sections. These lines, which can be equipped with units known per se, are arranged in such a way that the harvested material is further processed in two systems largely in parallel. After initiation of the elevating transport movement according to the invention for the grain/chaff stream, the separated grain is separated by means of final cleaning and collected for transport.

A further variant of the threshing process provides that harvested material cut off in the region of the partial mowing paths during the intake into the system is routed in two transversely merged partial conveyor streams, these two partial conveyor streams are fed to a common threshing process, then two separate conveyor streams are led into a respective separation phase and here both a discharge of the admixtures is activated and the feeding of grain crops with residual admixtures into the final cleaning system located at the top of the system according to the grain/chaff stream.

For the new threshing process, it is also provided that the separation and collection of the grains as threshed material is to be combined with an immediate, targeted removal of the residual admixtures in the form of straw and chaff. The internal processes are designed to ensure that all admixtures gathered by the two partial mowing paths are discharged close to the ground and distributed largely evenly over a harvested area of arable land.

The spatial arrangement of the process is configured so that the grain crops with the residual admixtures are conveyed upwards as a compact grain/chaff stream to an area above the intake, where the last stage of the separation process is carried out as final cleaning. A procedurally optimal assignment of these components provides that the intake of the harvested material according to the invention covers a region which is defined behind this axis in relation to the support and travel axis of the system. In this way, a compact high-rise conveying can be achieved in an advantageously central effective area of the system.

A conceptually improved combination of individual components, which are combined in a novel device, is provided for carrying out the method according to the invention. This starts from a cutting mechanism as an intake for the crop, which is then drawn into a threshing unit known per se. A grain/chaff stream generated in this process can then be separated via a final cleaning system in such a way that the harvested material can be fed in the form of grain to a collecting tank.

The further development according to the invention of this multi-part device provides that the threshing unit for receiving the grain/chaff stream discharged from the threshing unit now cooperates with an elevating conveyor which deflects the grain/chaff stream and defines an upwardly directed conveyor section in relation to the threshing unit. Starting from this basic consideration with a targeted deflection of the conveying flow, the grain/chaff stream achieves at least in phases a transport movement with a component in the vertical direction and a component in the direction of working travel—which corresponds to the field direction of travel.

The further optimisation of the device envisages that several elevating conveyors can also be provided on the at least one threshing unit. According to the further processing of the grain/chaff stream, the elevating conveyor(s) interact with at least one cross conveyor at the respective receiving end or discharge end. This ensures optimum flow distribution from the threshing units in terms of compact filling of the elevating conveyor and subsequent distribution during transfer to the final cleaning phase.

An optimum improvement of the device with a view to an increase of the harvesting performance provides that the cutting mechanism undertaking the mowing path is assigned two threshing units working essentially synchronously side by side with the at least one elevating conveyor. This ensures that a reaper path of at least the same size and defining a larger cutting width in comparison with known combine harvesters is established in the direction of working travel. In combination with the method, which incorporates the transport movement according to the invention, the device is now improved in such a way that the respective reaper paths can be fed to the individual components of the system via a comparatively shorter conveying path. This means that an optimum quality for the grain crops can be achieved while increasing threshing performance.

A cost-optimised implementation of the improved device concept provides that the two threshing units are equipped with known modules for sieving, separating and collecting the grain crops. In this connection, in the area of one or more elevating conveyors, the respective modules for the treatment and discharge of straw and chaff are so effective that these admixtures are separated with regard to the internal transport movements of the machine in the area close to the ground and can be rapidly discharged.

The complex design of the device provides that the two-threshing unit combination with the associated modules can also be integrated as a self-sufficient unit into varying basic structures in such a way that variable embodiments of system carriers that can be converted to the direction of working travel and the direction of road travel can take advantage of the advantageous design of the compact elevating conveyor separation.

The further design of the device provides that in the area of the elevated conveyor, which detects the upward flow of grain and chaff, at least one cross conveyor, which detects the inflowing mixture in the area of the final cleaning, is provided for feeding a tank or the like. This cross conveyor is configured in such a way that a largely constant mixture thickness is provided for separation in the area of the grain/chaff stream fed from the elevating conveyor phase of final cleaning.

The cross conveyor provided at the outlet end of the at least one elevating conveyor is equipped with an auger which axially displaces the inflowing mixture in a distribution pipe. This is arranged in such a way that partial quantities of the mixture displaced in one direction of action can be discharged through an axial slot in the bottom on the one hand and partial quantities displaced in the conveying direction can be fed to a filling level detection system on the other hand. This system is designed so that an essentially constant outlet flow passes through the axial slot into the final cleaning area.

For a particularly efficient control of this uniform feeding of the mixture, it is provided that the filling level detection system cooperates with at least one accelerating roller rotating beneath the axial slot and the respective material distribution can be controlled with its adjustable distance change in the area of the axial slot.

An optimum design of this cross conveyor provides for two counter-rotating acceleration rollers in the area beneath the axial slot and thus a volume of the mixture detected between them can be changed by means of changing the distance between the two accelerating rollers which can be influenced by the filling level detection. In the event that, for example, a mixture jam occurs in the vicinity of the filling level detector, this "pressure situation" is detected and the continuous distribution situation continues to be guaranteed by an enlargement of the axial slot through the adjustment of the distance of the accelerating rollers.

In view of the size of the overall system, it is provided that the cross conveyor can also have two end feed inlets in the area of the distribution pipe. As a result, one auger in each of these feed inlets displaces the mixture towards the centre of the pipe and the filling level detection system is located in this area.

An advantageous further development of the device with the features of claims 11 to 20 for carrying out the method according to claims 1 to 10 provides that the at least one intake and the at least one downstream threshing unit with the associated modules are arranged in the region of a functional frame which can be essentially configured in a U-shape in plan view and which can be aligned in a mobile manner with respective edge-side ground supports both on a field and in road traffic. The at least one elevating conveyor cooperating with an upper screening element and a collecting tank can be integrated into this two-position system with threshing device.

The concept of the functional frame, which is U-shaped in plan view, enables a particularly advantageous design in the region of the base supports. These are arranged in such a way that at least the cutting mechanism of the system is connected to the functional frame in the direction of direction of working traveling movement at least in some areas behind the respective leading wheel and/or wheel parts of the base support. The constructive design also provides for cutting, threshing, separating and conveying components known per se to be advantageously used as modular modules in the functional frame, so that application-specific versions of the mobile threshing/collecting device can be provided.

In view of the complex use of the device, it can naturally be equipped with one or more drive components and in this connection, both their control and the control of complex movements must be regulated via corresponding programmable control units.

It has been shown that the system according to the invention can be optimally integrated into the U-shaped functional frame when compact units are used. In this connection, it is provided that only one threshing unit, which is substantially central and mirror-inverted to the longitudinal centre plane of the system, is assigned to the cutting mechanism undertaking the mowing path. This makes better use of the available installation space, and the design in the area of the connecting components provided for suspension can be improved.

Naturally, this central threshing unit can also be advantageously equipped with two lateral elevating conveyors.

The design in the area of the at least one upper cross conveyor for processing the grain/chaff mixture can also be further optimised. In this connection, it is provided that the cross conveyor provided at the outlet end of the respective elevating conveyor is now (in contrast to the pipe conveyor described above) formed by at least one cross-oscillating conveyor preparing the final cleaning. The initiation of a first phase of the sieving and sifting process is now achieved with this intake of the mixture from the elevating conveyors. The cross-oscillating conveyor enables the processing of even conveying layers of grain lying below and chaff lying above and thus the possible optimisation of the wind winnowing process.

In this connection, it is provided that the two-layer conveying layers derived from the respective cross-oscillating conveyor can be influenced by at least one cross air flow. In this conveying phase an effective execution of the air separation in the area above at least one separation area is initiated. To this end, it is provided that the respective cross-oscillating conveyors interact with at least one catch plate arranged below them. The "generated" conveying layers are shifted from this to at least one further lower separation surface spaced by a fall level. Naturally, separation can be initiated by means of air separation, at least in the area of this drop level. In an optimised design, it is provided that the conveying then takes place via a second drop level, after which clean grain is fed into the lower sieve box. In each of the two drop levels, a controllable wind winnowing process can be realised by means of respective cross air flows which can also be switched on individually.

The invention relates, in particular thus, preferably to the or a threshing method for harvesting grain crops, wherein these are separated from a crop to be gathered, in particular in the form of grain, the latter is fed to a threshing phase after a gathering process taking place against a direction of working travel and during this phase the crop is processed as the respective grain crops and the admixtures in the form of straw and chaff, in particular such that substantial, dischargeable admixtures are separated from the threshed material, these are fed as a mixture with chaff or similar fine particles as a grain/chaff stream to a final cleaning stage and then the grains free from these residual admixtures are collected as threshed material. The threshing method is further developed in particular in that during at least one feed phase preceding final cleaning, the at least one grain/chaff stream is given a transport movement with a component in the vertical direction and a component in the direction of working travel.

The threshing method is preferably further developed in such a way that the grain/chaff stream to be displaced in several phases towards an upper final cleaning is guided by means of the transport movements in a confined space and thus a length of the threshing and conveying system which can be defined in the direction of working travel can be minimised, in particular such that a harvesting conveyor system having a largely variable working width in the direction of working travel can, after a changeover at right angles to the direction of working travel, be positioned in the form of a driving adjustment in such a way that, in a direction of road travel defined by this adjustment, this system can be moved largely autonomously in public transport.

The threshing method is advantageously further developed in such a way that the grain/chaff stream to be conveyed upwards from the threshing phase with the subsequent transport movement is fed to the final cleaning in one or more direction(s) to remove the chaff and, in this connection, the grain/chaff stream is guided during cleaning in the respective axes of movement in or against the direction of working travel.

The grain of the grain/chaff stream which is conveyed upwards and divided during the final cleaning process, is preferably fed into at least one collecting tank located at the top in relation to the intake and threshing process.

The chaff is preferably removed in one or more separation phase(s) before the grain is fed into the top collecting tank.

A combination of wind winnowing and sieving is advantageously used to separate the chaff from the grain/chaff stream.

The threshing method is preferably further developed such that, starting from a mowing path defining a cutting width with several harvesting lines, the crop is collected in at least two partial mowing paths, then these are introduced into the area of separate conveying, threshing and separating sections, the crop is further processed largely in parallel in two systems and, after an upward conveying transport movement of grain and chaff, the grain is separated and collected by means of subsequent final cleaning.

The threshing method is preferably further developed such that harvested material cut in the region of the partial mowing paths is transferred in two transversely merged partial conveyor streams, these two partial conveyor streams are each fed jointly to a threshing process, then two separate conveyor streams are transferred into a respective separation phase, and here a discharge of the admixtures is activated and the grain crops with residual admixtures are fed to a final cleaning stage located at the top of the system in line with the grain/chaff stream.

The separation and collection of the grains as threshed material in the vicinity of the intake is advantageous for the immediate removal of residual admixtures in the form of straw and chaff, in particular such that all admixtures collected by the two partial mowing paths are distributed largely evenly over a harvested area of arable land.

The threshing method is preferably further developed in such a way that the grain crops with the residual admixtures are conveyed up into an area above the intake as a grain/chaff stream and the last stage of separation is carried out here as final cleaning.

The invention preferably further relates to the or a device, in particular for carrying out the above-mentioned method, wherein the material supplied by a cutting mechanism or the like. The harvested material is drawn into a threshing unit from which straw and a grain/chaff stream are separated and, after its final cleaning, the grain can be fed to a collecting tank. The device is further developed in particular in that the threshing unit, in order to receive the grain/chaff stream discharged from it, cooperates with an elevating conveyor which deflects the grain/chaff stream and defines a conveying section directed upwards in relation to the threshing unit, in particular in such a way that the grain/chaff stream has, at least in phases, a transport movement having a component in the vertical direction and a component in the direction of working travel.

It is advantageous if one or more elevating conveyors are provided on at least one threshing unit arranged close to the ground.

It is preferable that the elevating conveyor(s) work together with at least one cross conveyor.

Two threshing units with at least one elevating conveyor are preferably assigned to the cutting mechanism undertaking the mowing path, working essentially parallel next to each other, in particular in such a way that a mowing path defining a larger working width than or at least the same size as that of known combine harvesters can be undertaken, in particular in such a way that the harvested material can now be fed to the system via comparatively shorter conveying paths and processed therein.

The device is advantageously further developed in that the two threshing units are equipped with known modules for sieving, separating and collecting the grain crops and in that modules for the treatment and discharge of straw and chaff are effective in the area of one or more elevating conveyors.

It is preferable that in particular, the threshing unit, which forms a two-threshing unit combination, can be integrated as a self-sufficient unit in varying basic structures as a system carrier.

Preferably, at least one cross conveyor is provided in the region of the elevating conveyor which detects the grain/chaff stream to be conveyed upward, which cross conveyor detects the inflowing mixture in the region before the final cleaning, in particular in such a way that a largely constant mixture thickness (33) can be provided for separation in the region of the grain/chaff stream supplied from the elevation phase of the final cleaning.

The device is advantageously further developed in that the cross conveyor provided at the outlet end of the elevating conveyor is provided with at least one auger which displaces the inflowing mixture axially in a distribution pipe, with which partial quantities of the mixture forming the grain/chaff stream displaced in the distributor pipe are on the one hand conveyed out through an axial slot on the bottom and on the other hand fed in the direction of conveyance to a filling level detection device, wherein the latter interacts with at least one accelerating roller rotating beneath the axial slot in such a way that the material distribution can be controlled by changing the distance of the accelerating roller in the region of the axial slot.

The device is preferably further developed in that in the area beneath the axial slot two accelerating rollers rotating in opposite directions are provided and a volume of the mixture detected between them can be changed by means of a change in the distance between the two accelerating rollers which can be influenced by the filling level detection.

The device is preferably further developed in that the cross conveyor in the region of the distribution pipe has two feed inlets at the ends, of which one auger in each case displaces the mixture towards the middle of the pipe, a corresponding filling curve builds up in this area and this can be detected with the adjustable filling level detection.

It is advantageous that the cutting mechanism undertaking the mowing path is assigned a threshing unit that is essentially central and mirror-inverted to the longitudinal centre plane of the system.

The cross conveyor provided at the outlet end of the elevating conveyor(s) is preferably formed by at least one cross-oscillating conveyor preparing the final cleaning, in particular in such a way that a first phase of a sieving and classifying process with even conveying layers of grain lying below and chaff lying above can be achieved.

Preferably, the two-layer conveying layers derived from the respective cross-oscillating conveyor can be influenced by means of at least one transverse air flow, in particular in such a way that a more effective phase of air separation can be introduced in the area above at least one separation surface.

The device is advantageously further developed in that the respective cross-oscillating conveyors interact with at least one catch plate arranged underneath them, from which the conveying layers can be displaced towards at least one lower separating surface spaced apart by a fall level, and separation by means of air separation is provided at least in the region of this fall level, in particular in such a way that largely clean grain passes via a second fall level into a lower screening box.

BRIEF DESCRIPTION OF THE DRAWINGS

From a description based on corresponding drawings, further details according to the invention and advantages of the method and the device for harvesting grain crops can now be derived. The corresponding drawings show the following:

FIG. 8 is a schematic diagram of a cross conveyor between the two collecting tanks of the system in the region of two elevating conveyors.

DETAILED DESCRIPTION OF THE PREFERRED EMBODIMENT

Figure 1:
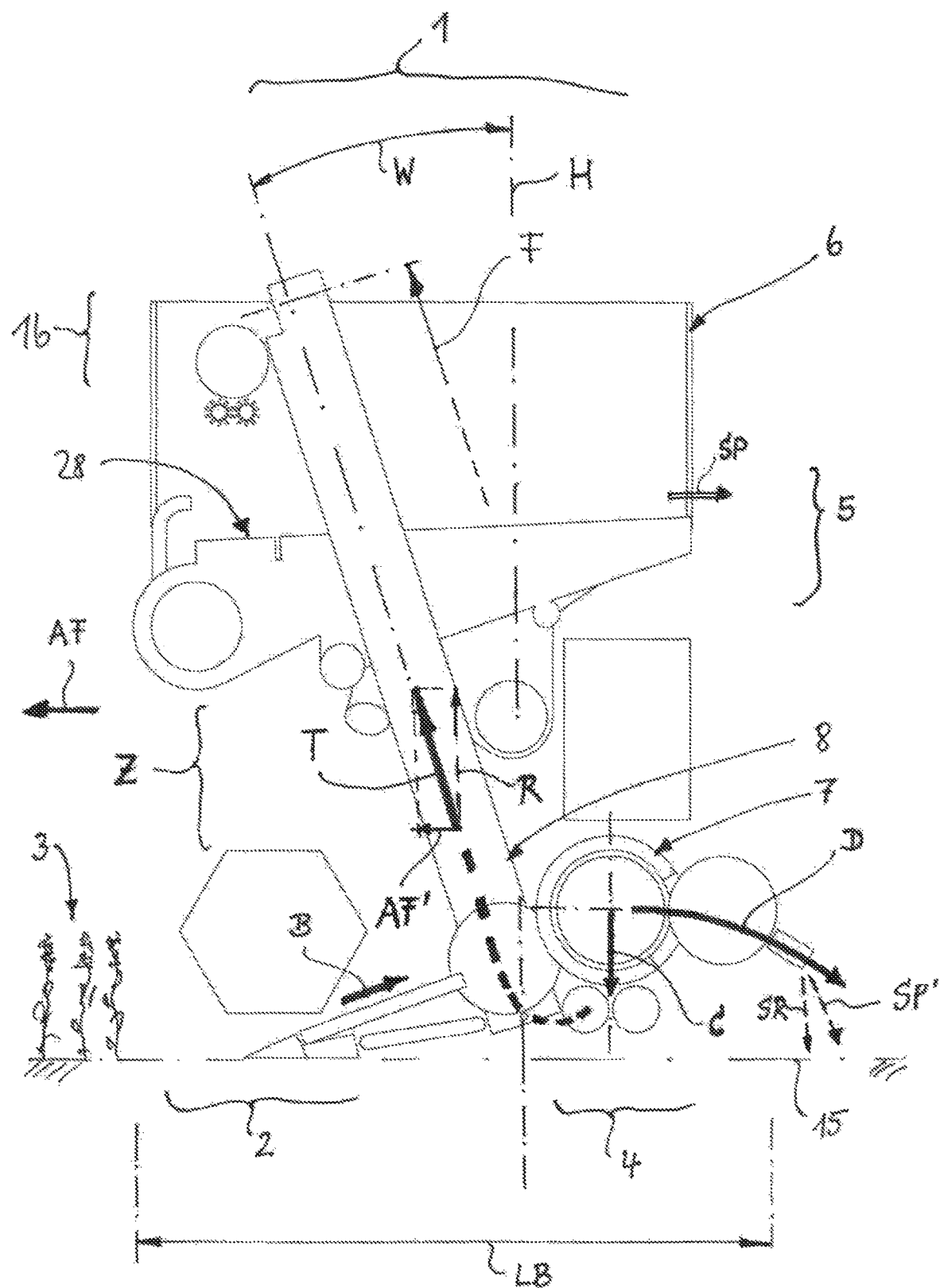
FIG. 1 is a schematic diagram of a device according to the invention in a side view cut according to line II-II with the modules illustrating the process sequence according to the invention.

The essential aspects of the newly designed threshing method provided in this connection as well as a conceivable combination of components for the variably designed device 1 emerge from an analysis of the basic components of a mobile harvesting design (FIG. 5 to FIG. 6) applicable to device 1 shown in FIG. 1.

In this connection, this device 1 is equipped with a cutting mechanism or the like, intake 2, with which harvested material 3 to be gathered in the form of grain, maize or the like is fed to a threshing phase 4 against a direction of working travel AF (arrow B). During threshing phase 4, the harvested material 3, consisting in particular of the cut stalks and ears of grain, is prepared in such a way that the respective grain crops and admixtures in the form of straw and chaff can be further processed. In FIG. 1, an arrow C shows the principle direction of formation and discharge of a grain chaff flow in the area of threshing phase 4. An arrow D indicates a direct, preferably ground-level discharge of admixtures in the form of straw and chaff which have been diverted in this first phase of separation.

This preparation and separation of harvested material 3 in threshing phase 4, which is known per se, is followed by a final cleaning process designated with 5, in which the mixture discharged from threshing phase 4 in direction C is loosened in the form of a grain/chaff stream and the residual admixtures are separated from the grain crops such that they can then be collected in the form of grain in a collecting tank 6.

Starting from these processes generally used for harvesting grain crops, the threshing process designed according to the invention is characterised by the fact that during at least one feed phase Z preceding the final cleaning 5, a transport movement (arrow T) with a component in the vertical direction R and a component in the direction of working travel AF' is imparted to the at least one grain/chaff stream according to arrow C (vector representation in FIG. 1, centre).

From the design implementation of this process principle in the associated version of device 1—as shown in FIGS. 2 to 7—it is clear that the threshing unit 7, in order to receive the grain/chaff stream C discharged from it, interacts with an elevating conveyor 8 which deflects it and defines an upwardly directed conveyor section F in relation to the threshing unit 7. A process control is thus realised in which the upwardly directed transport movement T—starting from the vertical axis H (as a theoretical limit)—an be optimally aligned in the range of a variable direction angle W to the direction of working travel AF.

This integrates a surprisingly efficient improvement into the known threshing method, wherein this is characterised by the fact that the grain/chaff stream C, which can also be displaced in several phases, can be guided in a particularly advantageous confined space by means of the newly defined transport movement T. As a result, a length LD of the threshing and conveying system forming device 1, which can be defined in the direction of working travel AF, can be reduced to a minimum.

With regard to the overall system in the manner of a "combine harvester", this means that a harvesting conveyor system 1 (FIG. 2) with a largely variable width AB (FIG. 6) in the direction of working travel AF is now positioned in a defined direction of road travel SF after a repositioning of the respective edge base supports 29, 30, 31, 32 (FIG. 6, swivel angle S) transversely to the direction of road travel SF. The base supports are marked 29', 30', 31' and 32' in this direction of travel. This means that the entire system can also be moved in public transport as a largely self-sufficient unit, since the possible road travel width can be maintained with the dimension defined as the length LD of the system.

The variable design concept of the threshing method (FIG. 2 to FIG. 4) provides for an extension of the design for high yield performance. The principle shown in FIG. 1 is also implemented if, on the basis of the width AB, which can be defined as a cutting width—which has several harvest lines EZ (FIG. 3) as a mowing path—the harvested material 3 can be collected in at least two partial mowing paths TB. On the basis of FIG. 2, the views according to FIGS. 3 and 4 show the respective procedure, wherein the two partial mowing paths TB and TB' are introduced into the region of separate conveying, threshing and separating sections. With this "double" harvesting capacity, harvested material 3 can be further processed in two systems, largely in parallel or synchronously. In this connection, it is conceivable to combine the grain/chaff streams and, after a common upward conveying movement T, to collect the separated grain in two collecting tanks 6, 6' by means of final cleaning 5.

In this connection, it is conceivable that the grain/chaff stream C to be elevated from the threshing phase 4 to the top discharge of the chaff in one or more conveying directions is fed to the final cleaning 5. It is provided that during the cleaning phase the grain/chaff stream can be displaced in the respective movement axes in or against the direction of working travel AF.

In this connection, it is of functional importance here that the grain of the grain/chaff stream C, which is conveyed upwards and divided during the final cleaning 5, is introduced into at least one collecting container 6, 6', tank or the like located at the top in relation to the intake process B. Before this introduction of the grain into the upper collecting container 6, 6' (FIG. 1 to FIG. 3), the chaff is removed in one or more separation phases by a blowing process or the like (arrow SP). It has been shown that in this second phase of separation, namely to separate the chaff SP from the grain/chaff stream C, a combination of wind winnowing and sieving can be used advantageously.

To carry out the process variant with the two partial mowing paths TB, TB', it is provided that the harvested material 3, which has been cut and gathered in direction B, is transferred to the two synchronous system sections in two transversely merged partial flows 9, 10, 11, 12 (FIG. 4). These two respective partial flows 9, 10 or 11, 12 are thus jointly fed to their threshing process in the region of the threshing units 7, 7'. From there, two separate flows can be transferred to a respective separation phase 13, 14 or 13', 14'. In these separation phases, a discharge of the admixtures is activated according to arrow D, wherein in particular a mixture of chaff SP' and straw SR is discharged and distributed directly onto the area of arable land 15. This discharge is illustrated with the arrow D in FIG. 1.

Figure 2:
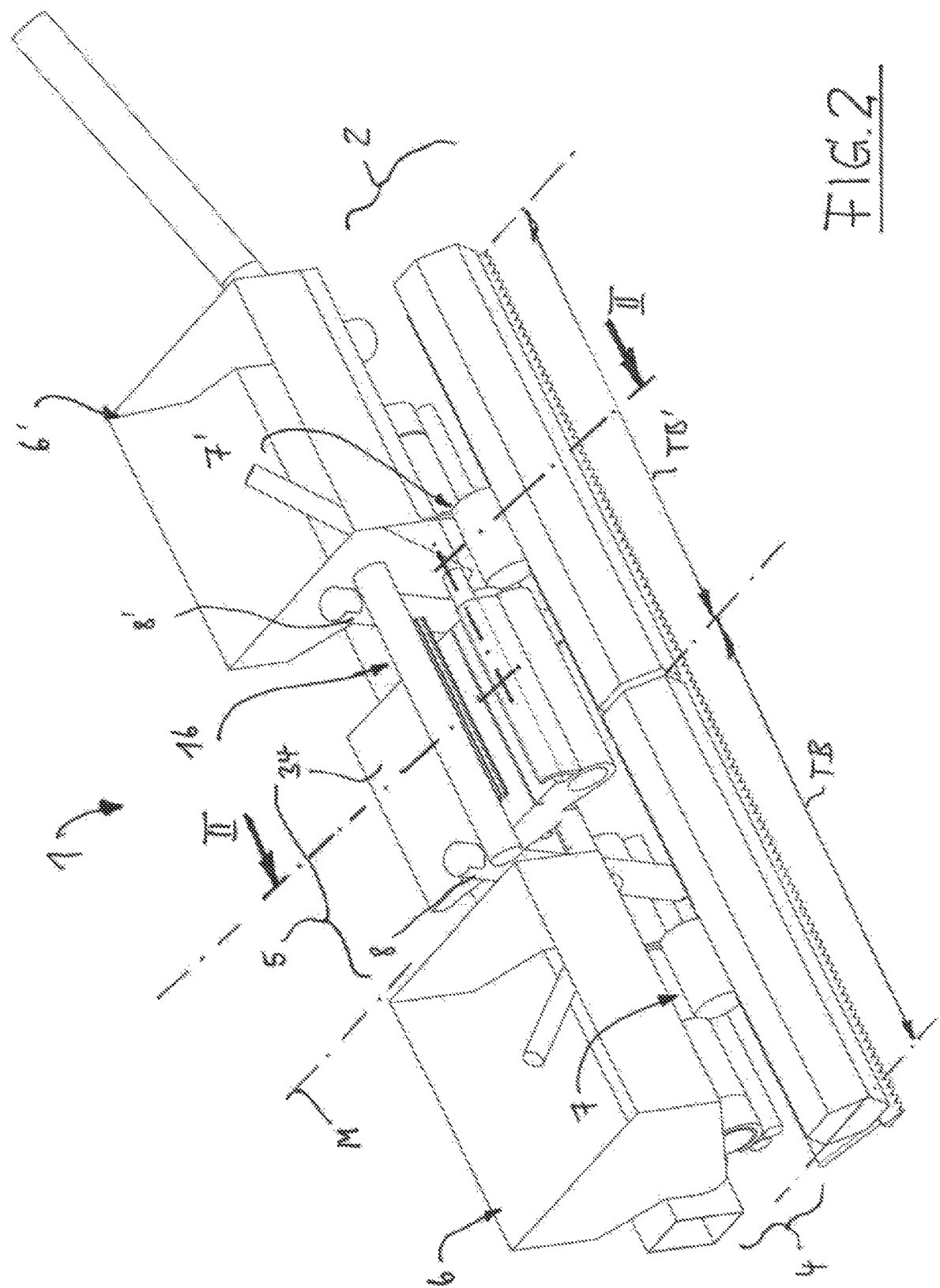
FIG. 2 is a perspective view of the device similar to FIG. 1 with two threshing units and their associated modules.
Figure 3:
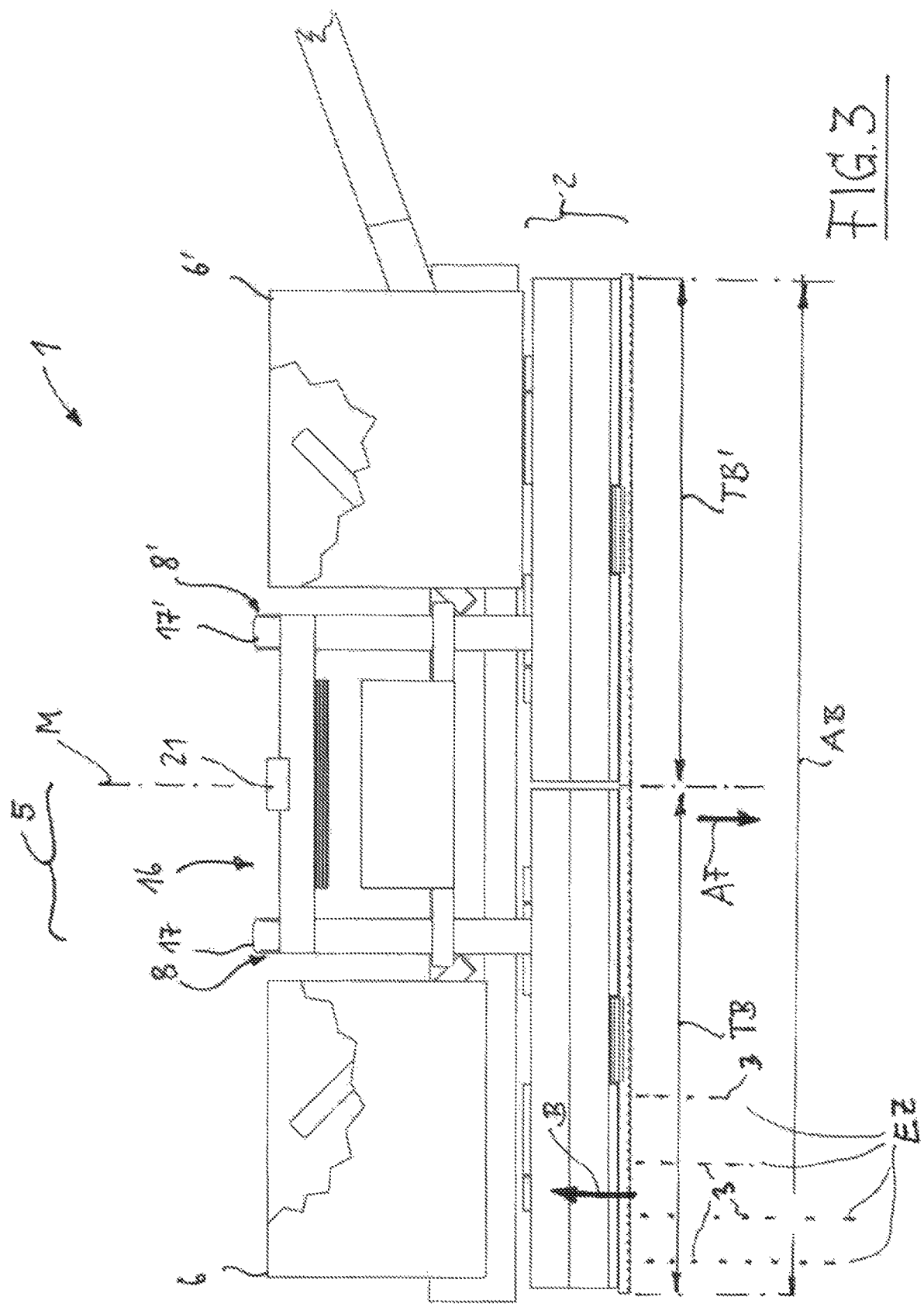
FIG. 3 is a front view of the system according to FIG. 2.
Figure 4:
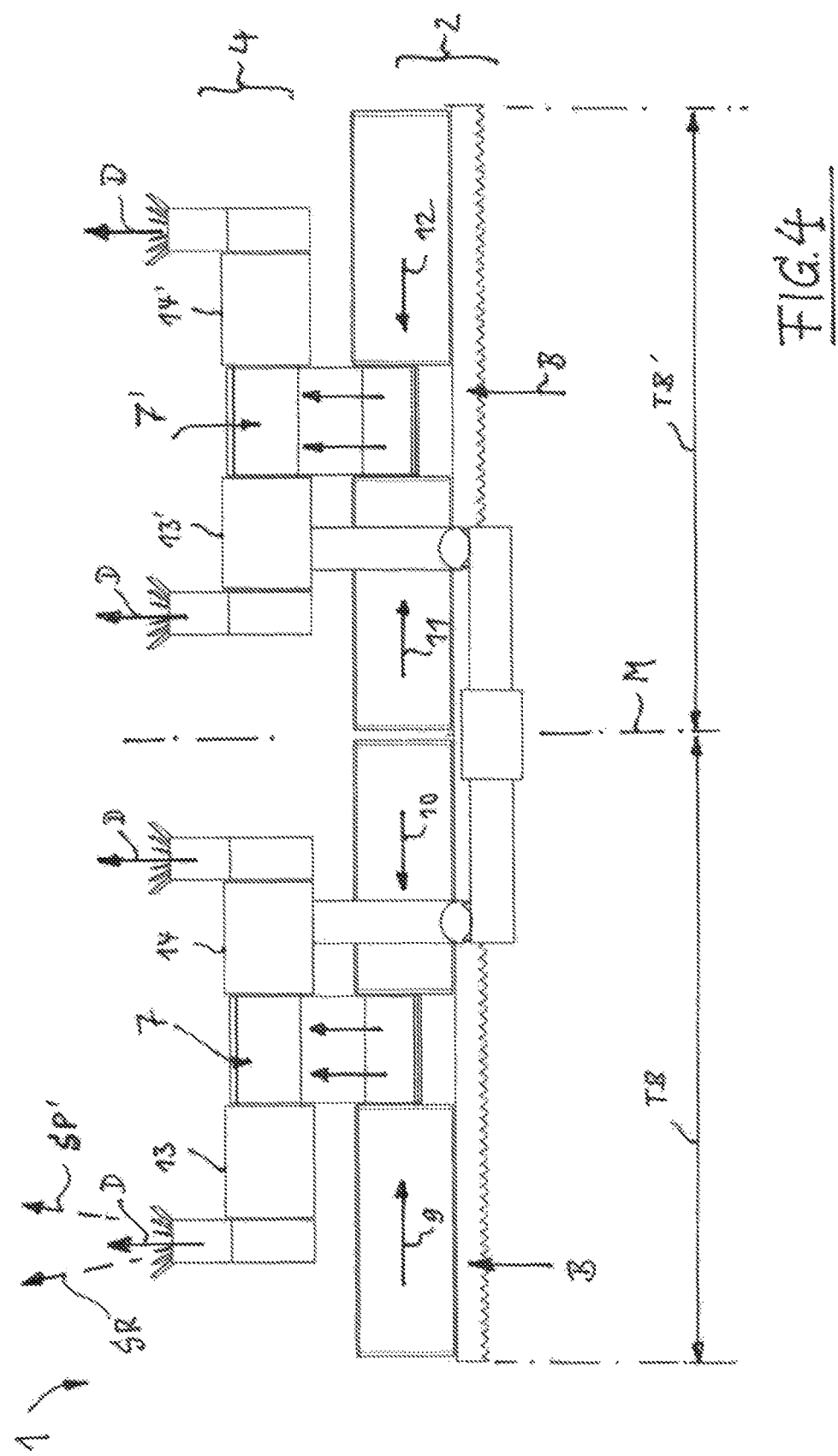
FIG. 4 is a top view of the system according to FIG. 2 without upper sieve assembly and collecting tank.

In the region of this first phase of the separations 13, 14, 13', 14', which is carried out in pairs, corresponding modules are to be arranged in such a way that the grain crops with remaining residual admixtures can be fed as the grain/chaff stream C to the final cleaning 5 at the top of the system (FIG. 2, FIG. 3). This makes it clear that the method according to the invention is advantageously directed towards the separation and collection of the grains as threshed material in the vicinity of intake B with an immediate targeted discharge of residual admixtures in the form of straw SR and chaff SP in a confined space. An optimal harvest result can be achieved with this compact process sequence. In this connection, it is advantageously provided that all the admixtures picked up by the two partial mowing paths TB, TB' can be separated at the earliest possible processing stage and distributed largely evenly over a harvested area of arable land 15.

The overall concept of the new method is aimed at ensuring that the grain/chaff stream C, which is to be displaced in several phases, can now be guided in a particularly narrow space by means of the "deflected" transport movement T. This results in a surprising design improvement, because a length LB (FIG. 1) which can be defined in the direction of working travel AF and includes the main components of the intake, threshing and conveying system can have minimal dimensions. The system, which has a structurally variable working width AB (FIG. 3) in the direction of working travel AF—here with two partial mower paths TB, TB'—can be aligned to the "length dimension" LB after changing over to a direction of road travel SF (arrow S, FIG. 6) in the area of the base supports 29, 30, 31, 32—a likewise variable support structure. This means that the maximum permissible dimensions required in road traffic are complied with and the system can be moved largely independently in public transport.

Based on the above-mentioned double arrangement of threshing systems in the area of the partial mower paths TB, TB', an adaptation of the system according to the invention enables the possible provision of several of the elevating conveyors 8 shown in FIG. 1 on the at least one threshing unit 7, 7'. It is clear from the illustrations in FIGS. 3 to 5 that here, largely symmetrically to the longitudinal centre plane M, two elevating conveyors 8, 8' are provided for feeding the final cleaning 5 which is centrally arranged here. In this connection, the elevating conveyors 8, 8', at least at the top outlet end 17, 17', naturally interact with at least one cross conveyor 16, which controls the introduction of the grain/chaff stream C conveyed up with the respective transport movement T, T' into the region of the final cleaning 5.

With this system of a double arrangement of threshing unit 7, 7' and elevating conveyors 8, 8', device 1, which has a working width AB, is adapted to a substantial increase in output. It has been shown that a mowing path defining a larger cutting width or one of at least the same size in comparison with known combine harvesters—in the form of the two partial mowing paths TB, TB'—can be accommodated. Based on this first component of a concept for increasing performance, the integrated "vertical alignment" of the system with deflected transport movement T, T' of the grain/chaff stream C, C' also has the effect that the mowing path to be gathered for harvesting can now be fed to the individual components of the system via comparatively shorter conveyor paths F. As a result, an overall more compact device 1 is proposed, which enables the processing of harvested material 3 with an improved energy balance.

A cost-optimal improved embodiment of device 1 provides that the two threshing units 7, 7' are equipped with known modules for the sieving, separation and collection of the grain crops. With these modules, variable combinations can then be built in which respective modules for the treatment and discharge of straw SR as well as chaff SP, SP' are functionally effectively assigned in the region of one or more elevating conveyors 8, 8'. This creates a two-threshing unit design that can be integrated as a self-sufficient unit in varying basic structures—for example in the form of mobile system carriers. As a result, different application-specific concepts can be provided for the customer.

Based on the front feed with increased conveying capacity in the region of intake 2 and the immediately following compact first separation, an optimum design in the region of the second separation phase with grain collection is of particular importance. It is provided that in the area of the elevating conveyor 8, 8' which captures the grain/chaff stream C, C' to be conveyed up, at least one cross conveyor 16 which captures the inflowing mixture in the area of the final cleaning 5 is provided with a conveyor-compatible transfer and optimisable discharge of grain and chaff SP.

Figure 6:
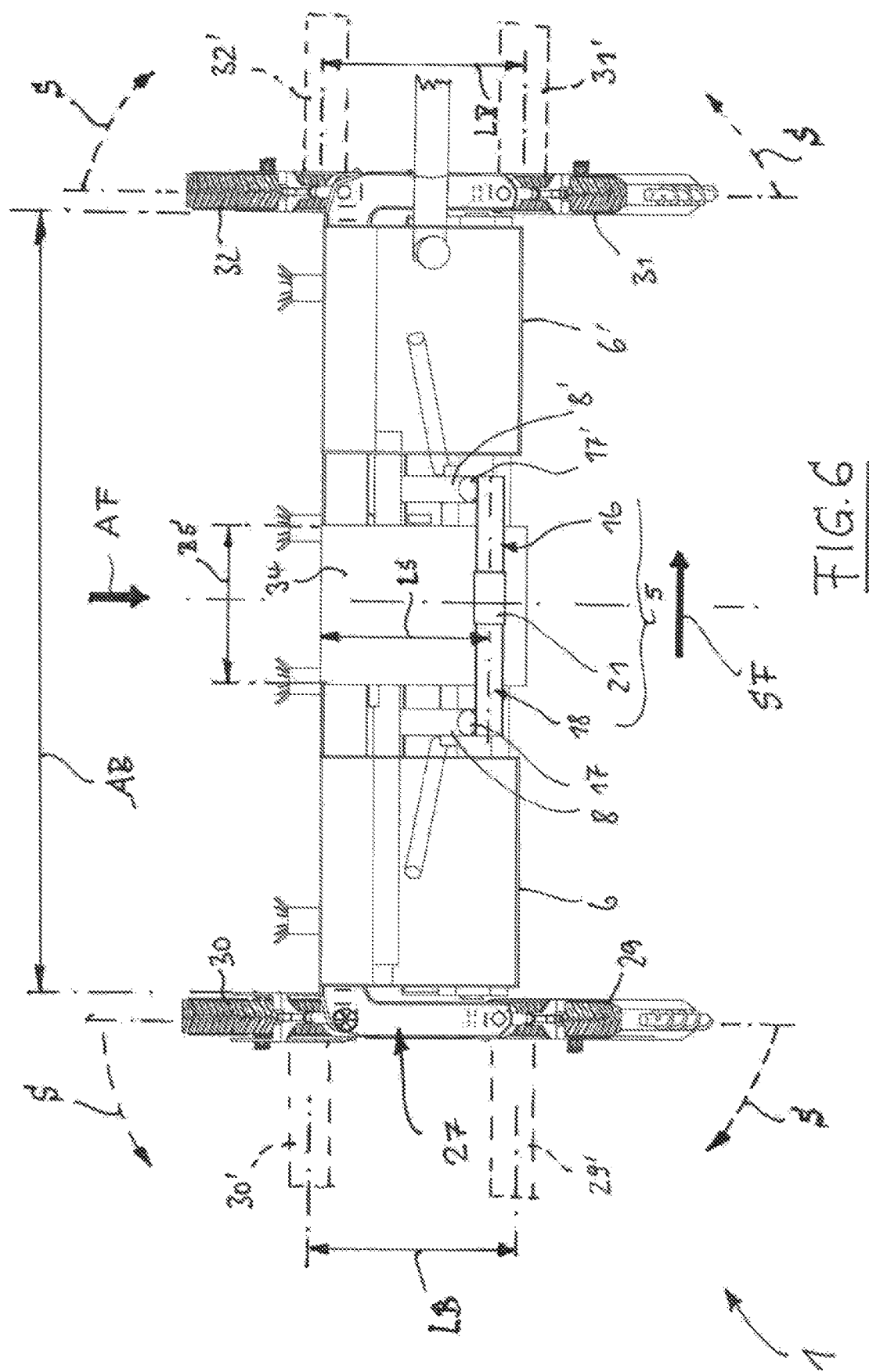
FIG. 6 is a top view of the mobile system according to FIG. 5.

In this connection, the aim is to provide a largely constant mixture thickness 33 in the region of the grain/chaff stream C, C' fed in each case from the elevating phase of final cleaning 5 in the area of a separating surface 34 (width BS, length LS) extending below the cross conveyor 16 to separate the chaff SP from the grain (FIG. 6).

Figure 8:
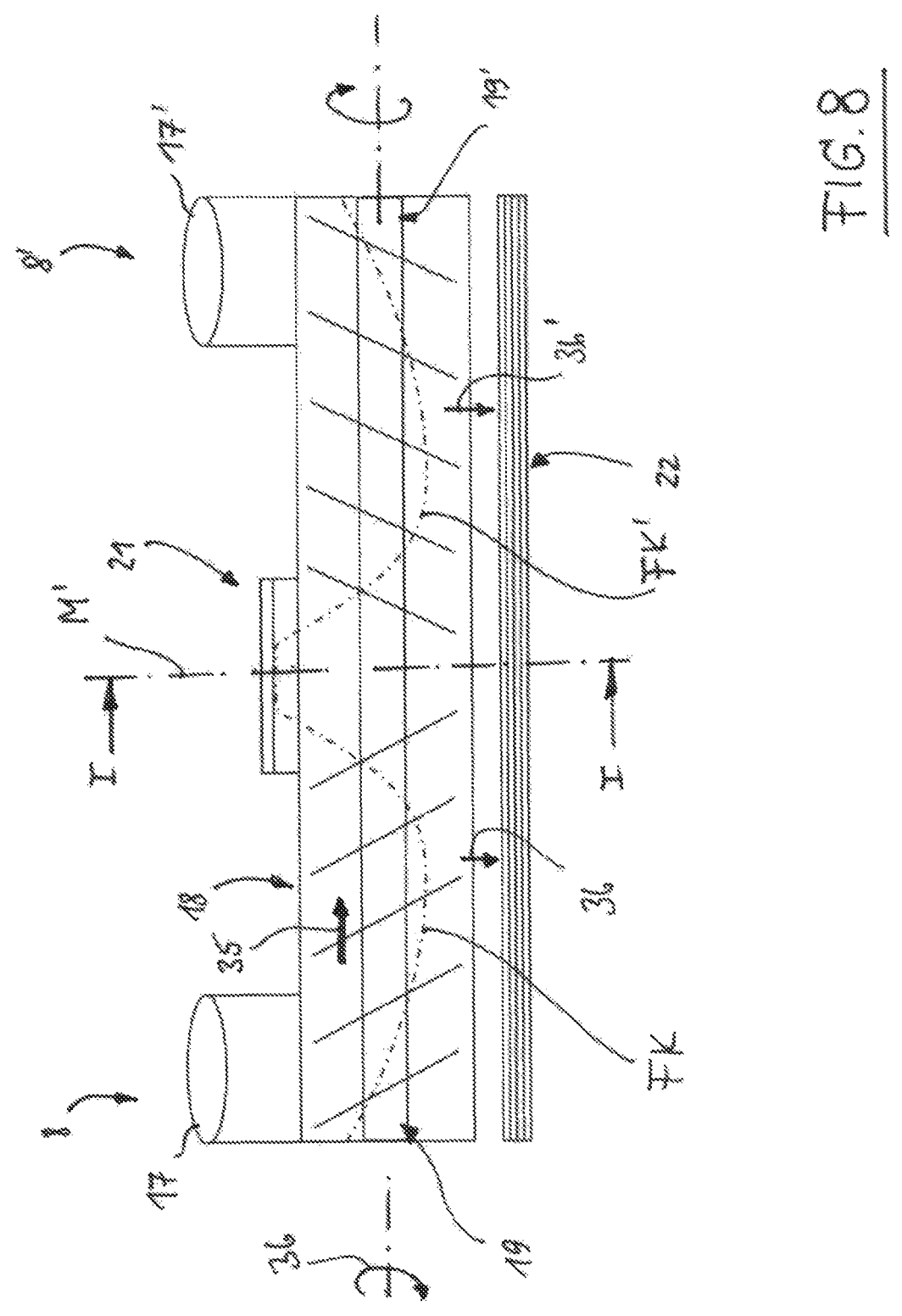
Figure 9:
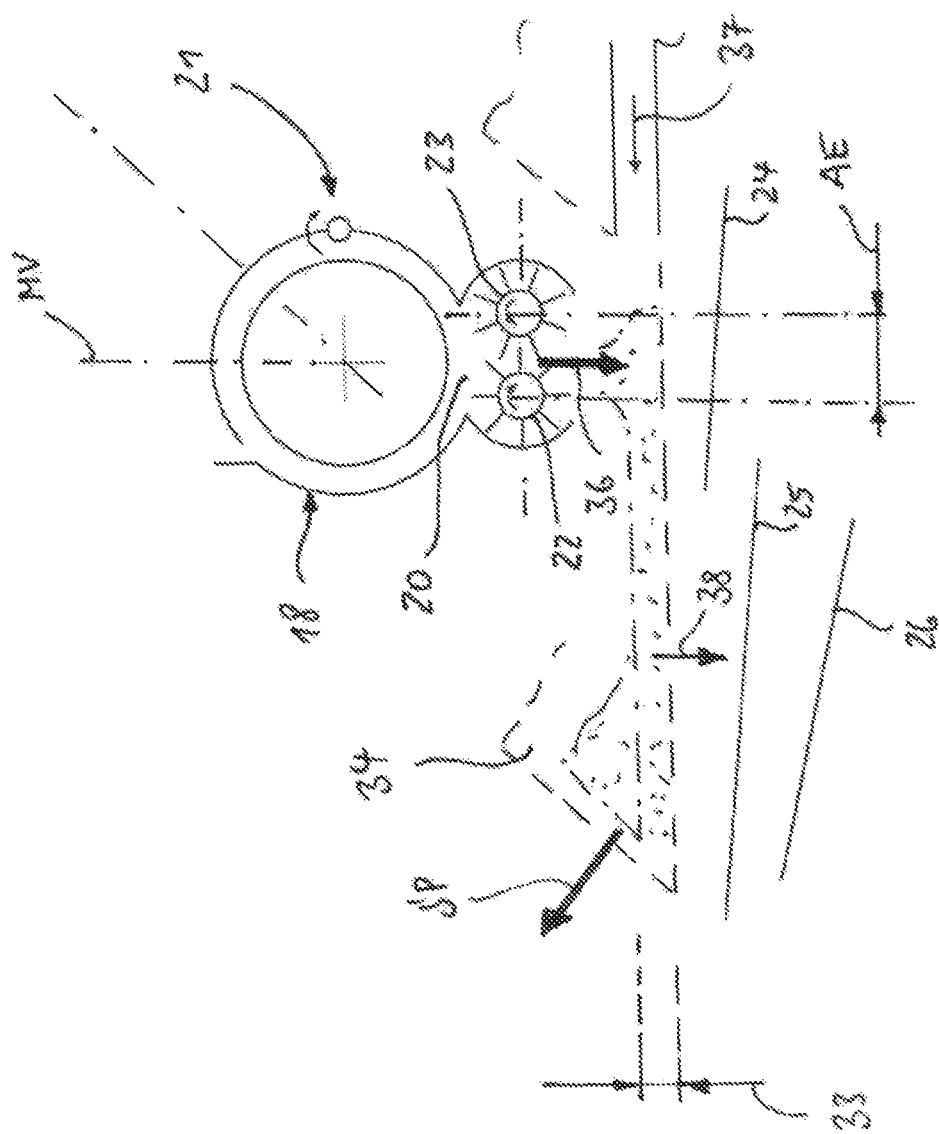
FIG. 9 is a sectional view according to a line I-I in FIG. 8.

The overview illustrations in FIGS. 8 and 9 show the improved design in the region of the cross conveyor 16. The cross conveyor 16 provided at the outlet end 17 of the elevating conveyor 8 is equipped with an auger 19 which axially displaces (arrow 35) the mixture flowing in the direction of arrow T, T' according to the transport movement in a distribution pipe 18 and has a direction of rotation 36. With this auger 19, the displaced partial quantities of the mixture can be discharged from the distribution pipe 18 on the one hand through an axial slot 20 at the bottom. On the other hand, a partial quantity displaced in the direction of arrow 35—corresponding to the conveying direction of auger 19—is fed to a filling level detection system marked 21.

This filling level detection 21, which can be constructively variably configured, interacts with at least one rotating accelerating roller 22, 23 beneath the axial slot 20. As a result of the detection of the filling level, the rollers 22, 23 can be influenced so that the material distribution in the area of the axial slot 20 is controllable according to the volume flow exiting in the direction of arrow 36.

It is also clear from the illustrations in FIGS. 8 and 9 that two accelerating rollers 22, 23 rotating in opposite directions are advantageously provided in the area beneath the axial slot 20 and a volume of the mixture detected between them can be changed by means of a distance change AE of the two accelerating rollers 22, 23 which can be influenced by the filling level detection 21.

Based on the system of the two threshing unit combination described above (FIG. 2 to FIG. 8), it is clear that the cross conveyor 16 has two end feed inlets at 17 and 17' in the area of its central distribution pipe 18, which interacts with the elevating conveyors 8, 8'. Starting from these, the mixture is shifted towards the pipe centre M' by means of a respective auger 19, 19'. In this region, the filling level detection 21 is then arranged such that by means of the distance adjustment in relation to the axial slot 20—already described in the area of the auger 19—the volume of the emerging grain/chaff stream 36 can be regulated with regard to the cleaning provided beneath—for example by wind winnowing in direction 37. FIG. 9 shows the principle use of a combination of wind winnowing and sieving with the arrows 37, SP and 38 (falling grain), wherein the respective sieve elements 24, 25, 26 or similar additional modules known per se are shown here.

Figure 5:
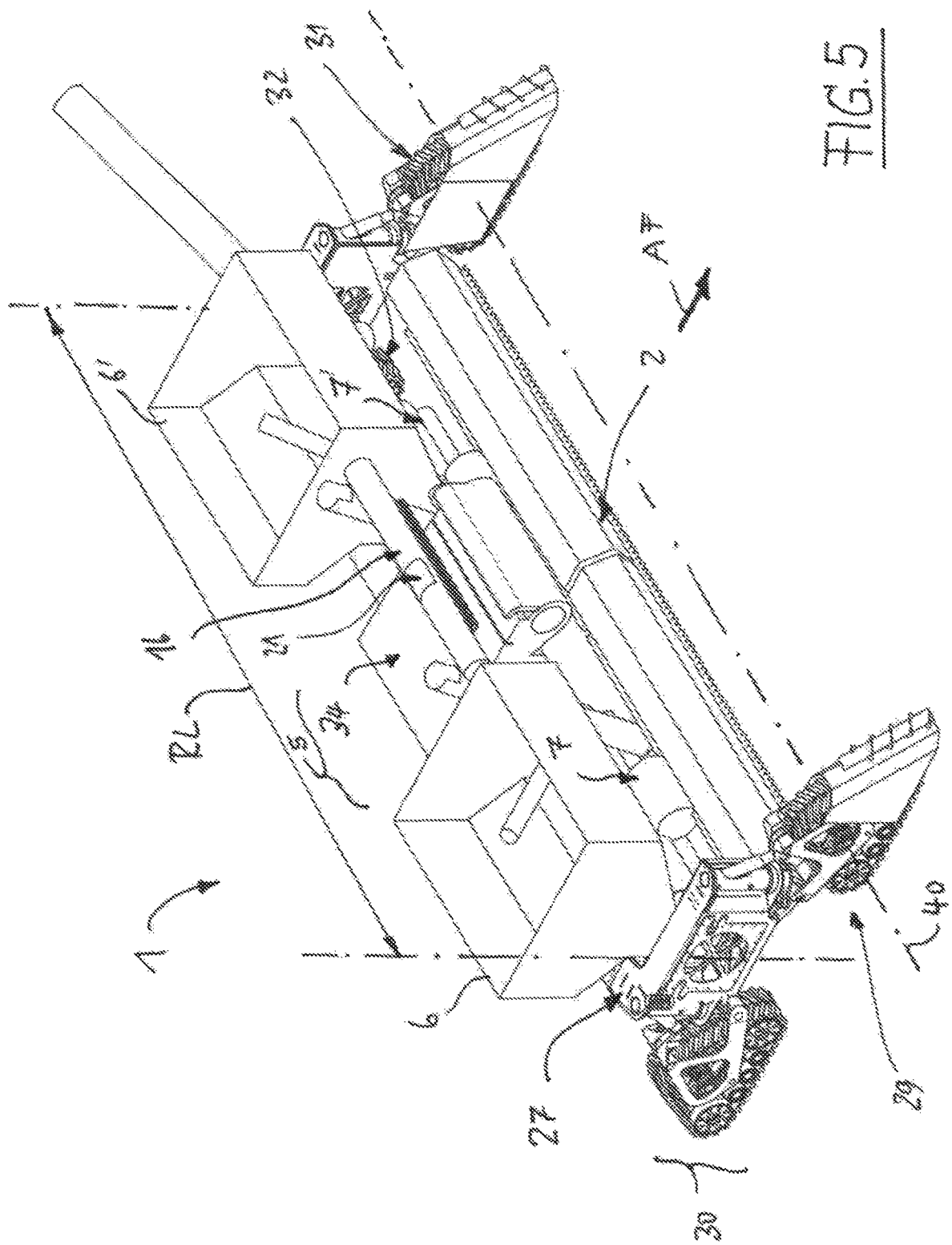
FIG. 5 is a perspective view similar to FIG. 2 with threshing and separating modules integrated in a U-shaped functional frame with lateral base supports.
Figure 7:
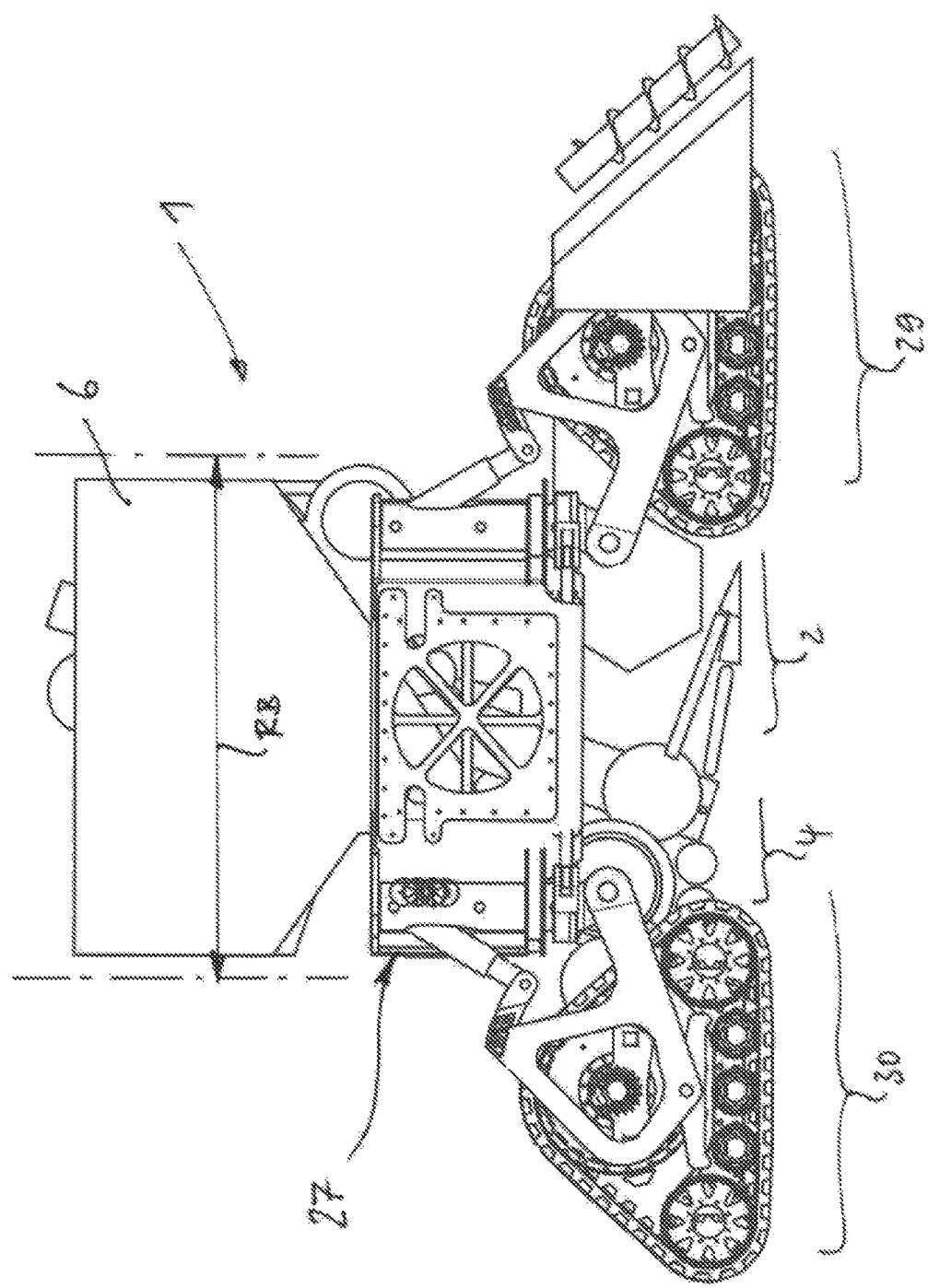
FIG. 7 is a side view of the system comprising the movable base supports in the direction of working travel as shown in FIG. 5.

The device described above for carrying out the procedure according to claims 1 to 10 can be completed to form an overall mobile unit (FIG. 5 to FIG. 7). It is provided that the components of the at least one intake 2 as well as the at least one downstream threshing unit 7, 7' are arranged in the area of a functional frame 27 (FIG. 6, FIG. 7) which can be designed essentially U-shaped in plan view (FIG. 6) and which can be aligned with the respective edge-side base supports 29, 30, 31, 32 both on a field 15 and in road traffic (line diagram in FIG. 6).

Naturally, at least one elevating conveyor 8, 8' cooperating with an upper final cleaning 5 and a collecting tank 6, 6' is also integrated in this functional frame 27. This demonstrates the modular design of this new type of "combine harvester" consisting of varying modules.

An optimum constructional design of this mobile device 1 can be seen from FIG. 5 and FIG. 7, wherein at least the cutting mechanism 2 of the mounting of the system can be arranged in the direction of working travel AF at least in some areas behind respective base supports 29, 31 of the functional frame 27 which are leading here. In comparison with the "linear" combine harvesters known per se, this results in a further optimisation possibility in that a front support axle 40 (FIG. 5), which can be defined between the base supports, no longer restricts the space of the system—with the dimensions RB and RL—which can be used both in the direction of working travel AF and during road travel SF.

An overview of the system with the functional frame 29 also makes it clear that cutting, threshing, separating and conveying components known per se can be used in such a way that an overall modular assembly can also be provided from cost-optimised standpoints. It is understood for the entire structure of the new combine harvester concept that respective position specifications such as "front", "rear", "forward", "up", "down" and "backwards" are related to the forward direction of working travel AF, with intake 2 typically located at the front and the remaining crop being discharged at the rear.

It can be deduced from professional considerations that the device 1 described above is equipped with the corresponding drive components in all of the designs, which are not described in detail. Appropriately adjustable control units with manually operated and/or automatic components can be provided for optimum handling—both in the direction of working travel AF and in the direction of road travel SF. These unspecified electronic and electrical modules may also be arranged in the area of a driver's cab which is also unspecified. In principle, the design of a "driverless" system using variably executable components for programming and remote control is also conceivable.

The device according to the invention with at least one of the features of claims 11 to 20 for carrying out the method according to claims 1 to 10 is characterised in that the at least one intake 2 and the at least one downstream threshing unit 7, 7' are arranged in the region of a base support which can be designed substantially U-shaped in plan view and is provided with respective edge-side base supports 29, 30; 31, 32 both on a field and in road traffic, and in which at least one elevating conveyor 8, 8' for the transport movement T, T' can be integrated which cooperates with an upper sieving element of the final cleaning 5 and at least one collecting tank 6, 6'.

For this purpose, it is provided that at least the cutting mechanism 2 of the system is arranged in the direction of working travel AF at least in some areas behind a transverse axle 40 of respective leading base supports 29, 31 of the functional frame 27.

A further advantage is achieved by using known cutting, threshing, separation and conveying components as modular modules in the functional frame 27. In addition, the system may be equipped with one or more drive components that are controllable via at least one control unit.

Figure 10:
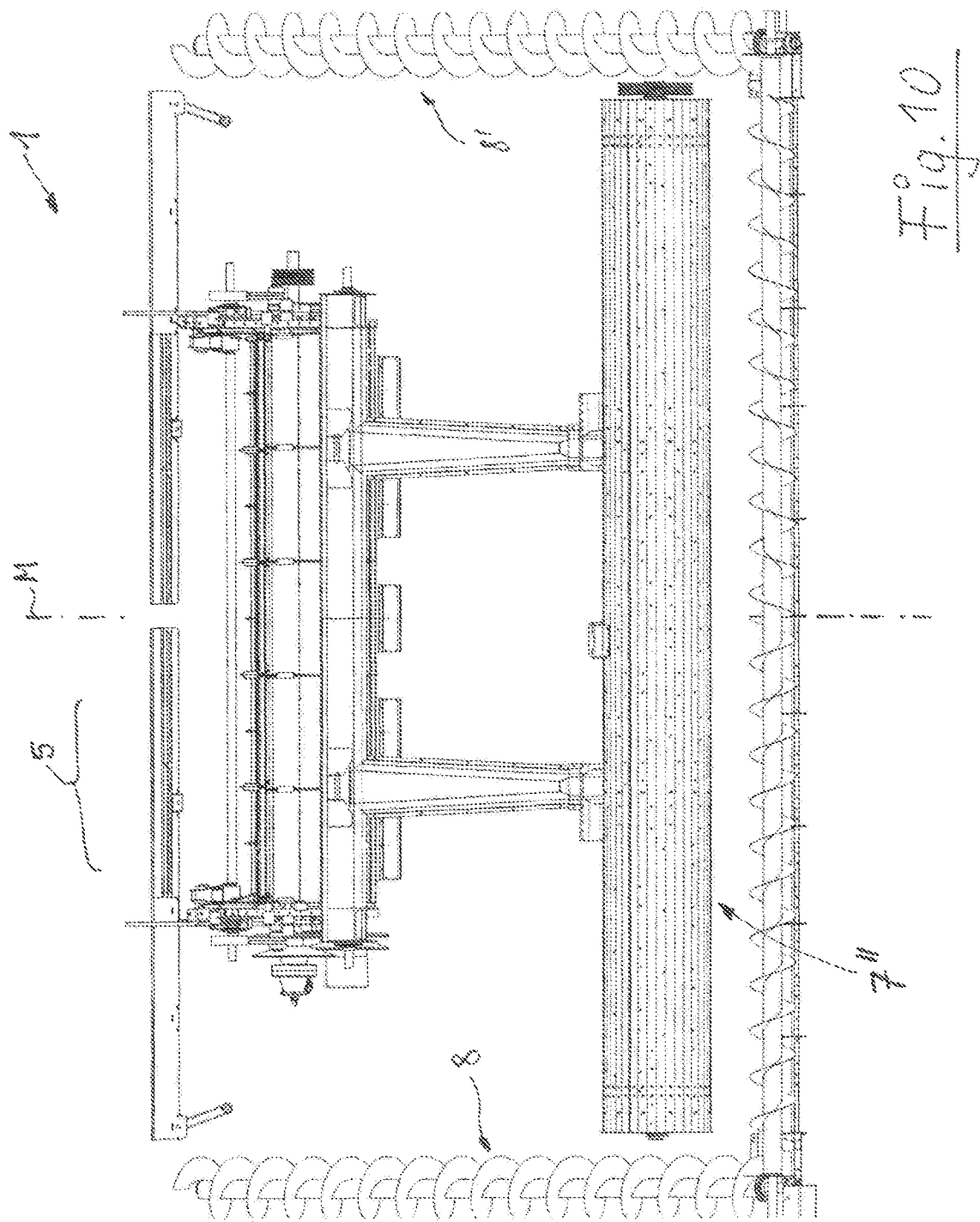
FIG. 10 is a front view of the system similar to FIG. 3 with only one central threshing unit.

A further variation of the system according to the invention is shown in FIG. 10. The device 1 depicted here shows that the cutting mechanism 2 (FIG. 5) undertaking the mowing path is assigned a threshing unit 7″ arranged substantially centrally and mirror-inverted to the longitudinal centre plane M of the system. This allows further design optimisation of the overall system (FIG. 4).

Figure 11:
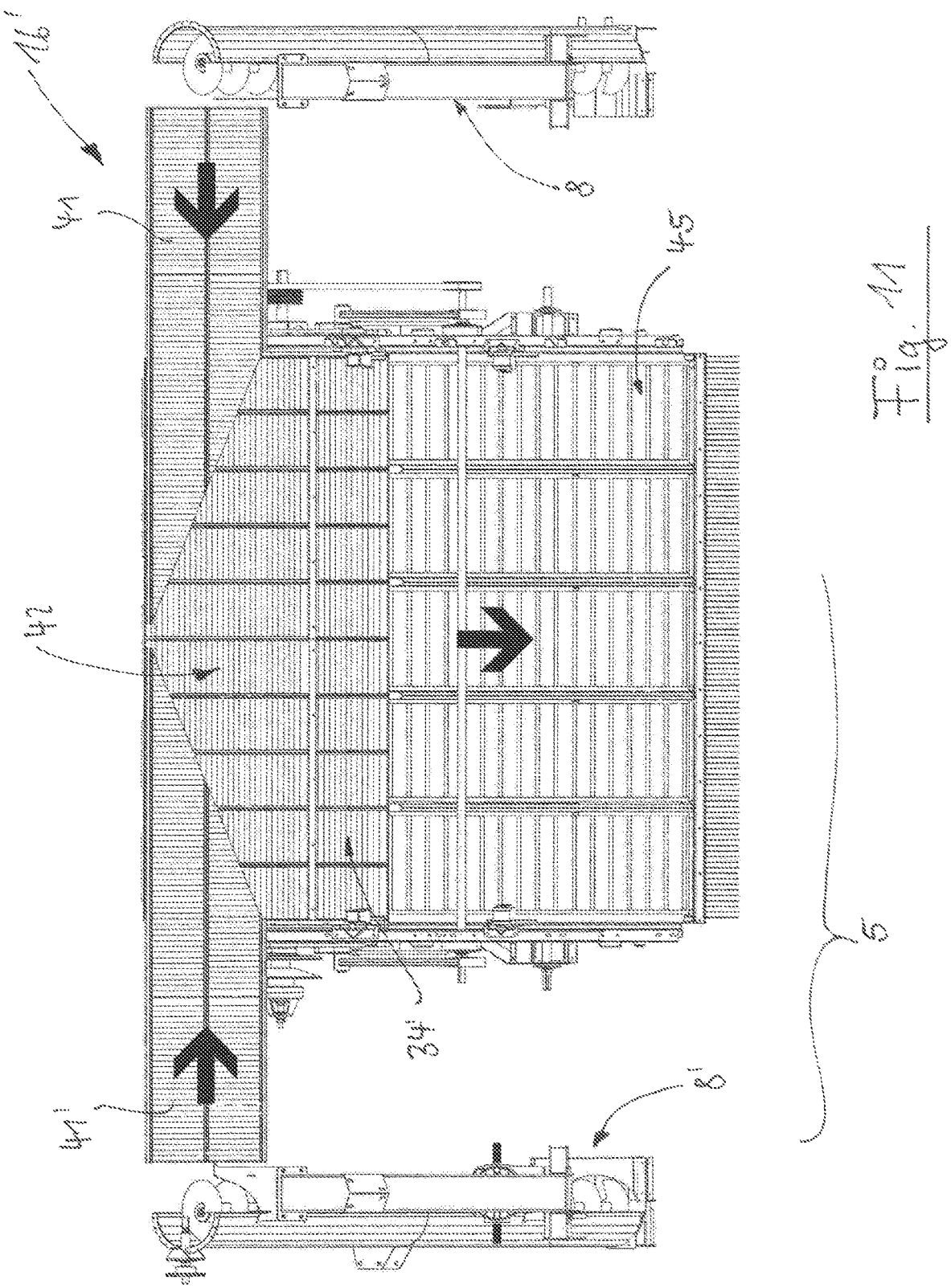
FIG. 11 is a top view of the system similar to FIG. 3 in the area of the upper final cleaning with respective cross-oscillating conveyors.
Figure 12:
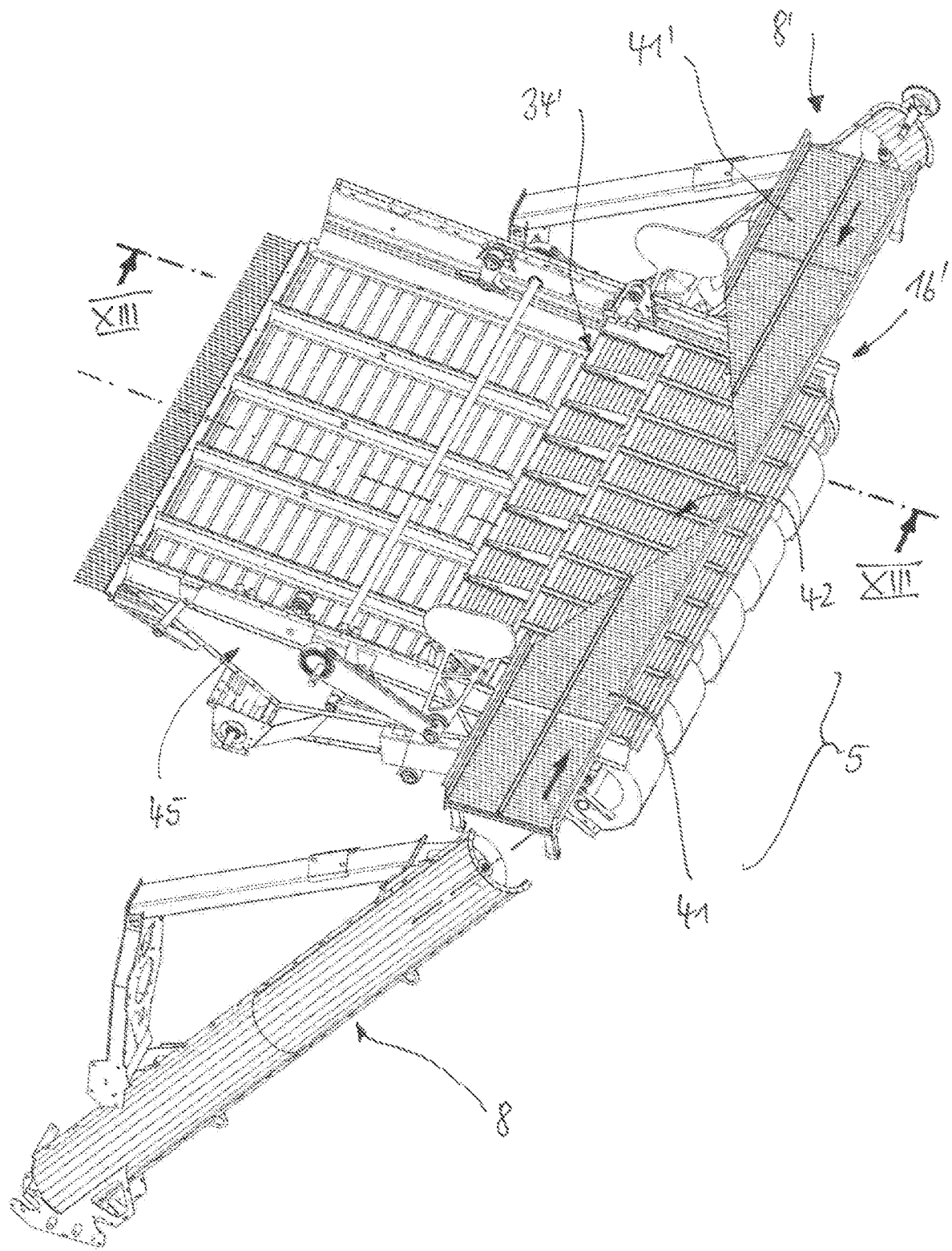
FIG. 12 is a perspective view of the system according to FIG. 11.
Figure 13:
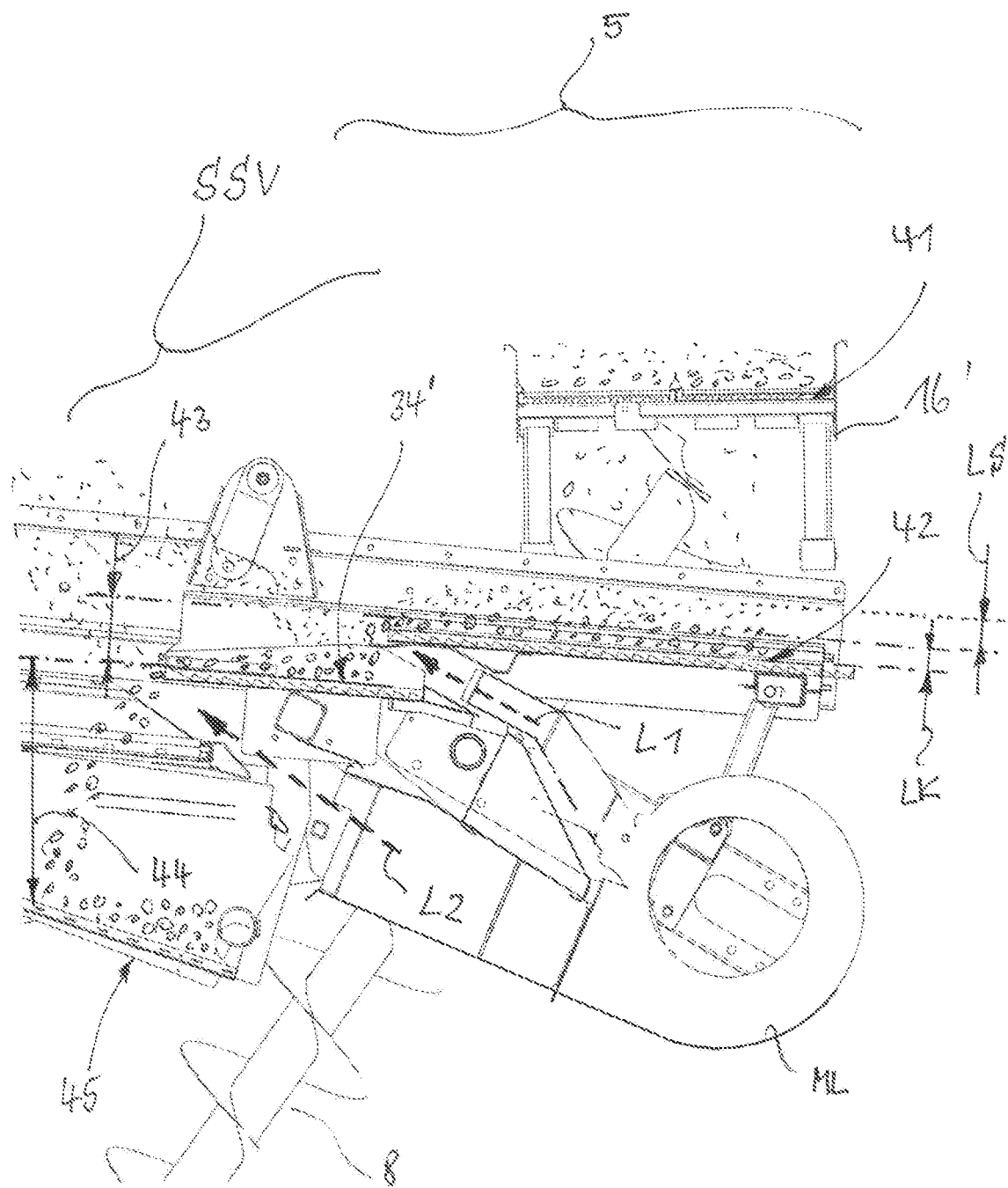
FIG. 13 is a cross-sectional view of the system according to a line XIII-XIII in FIG. 12.

Further design improvements are aimed at an optimisation in the area of the upper final cleaning 5. The illustrations in FIGS. 11 to 13 show design details in the region of this unit. It is provided that the cross conveyor 16' provided at the outlet end of the respective maximum conveyor 8, 8' is formed by at least one cross-oscillating conveyor 41, 41' preparing the final cleaning phase. Based on the already shown separation area 34 (FIG. 6), the modified design in the area of the cross conveyor 16' now provides for an improved sieve box feed. Immediately after the elevation process, a first stage of the sieving and sifting process is carried out in the area of elevating conveyors 8, 8' in such a way that a largely even distribution of the grain layer LK or chaff layer LS (FIG. 13) is achieved. It has been shown that with the design shown in FIGS. 11 to 13 a first phase of the sieving and sifting process SSV with even conveying layers of bottom-placed grain LK and top chaff LS can be achieved. This allows an effective wind winnowing process with high efficiency to be initiated subsequently. It is clear from the cross-sectional representation in FIG. 13 that the two-layer conveying layers derived from the respective cross-oscillating conveyor 41, 41' can be influenced by at least one cross air flow L1 or L2. The generation of the cross air flows L1 and L2 is possible with the known construction groups ML. The schematic illustration shows that an effective phase of wind winnowing can now be initiated in the area of L1 and L2 in such a way that an effective transfer of the chaff to be separated is possible, especially in the region of a separation area 34'.

The implementation of this multi-phase wind winnowing provides that the respective cross-oscillating conveyors 41, 41' can interact with at least one catch plate 42 arranged beneath them. From this catch plate 42, the LK, LS conveying layers already produced here by means of the vibrating process at 41 can be shifted to at least one lower separation surface 34' spaced by a drop level 43. Naturally, at least in the area of this fall level 43, separation can take place by means of air separation with air flow L1. It is advantageously designed so that on the way to a lower sieve box 45, a second fall level 44 is integrated into the system in such a way that grain largely cleaned of chaff is passed through the sieve box 45 and this can be conveyed in the usual way to the collecting containers 6, 6' (FIG. 5).

The invention claimed is:

1. A threshing method for a system harvesting grain crops, wherein grains are separated from harvested material, comprising:
    gathering harvested material in a direction against a direction of working travel, the harvested material including grain crops and admixtures;
    after the gathering process, feeding harvested material to a threshing phase;
    processing the harvested material during the threshing phase such that essential, dischargeable admixtures are separated from the grain crops
    feeding a grain/chaff stream to a final cleaning;
    during at least one phase preceding the final cleaning, imparting a transport movement to the grain/chaff stream, the transport movement having a component in a vertical direction and a component in the direction of working travel; and
    collecting the grain crops generally free of residual admixtures,
    wherein the system is configured to move in the direction of working travel and in a direction of road travel, and the direction of road travel is transverse to the direction of working travel.

2. The threshing method according to claim 1, wherein:
    the final cleaning comprises an upper final cleaning; and
    the grain/chaff stream is displaced in several phases towards the upper final cleaning by being guided to a narrow space by means of the transport movement;
    thereby providing the system having a length defined in the direction of working travel that is minimized such that the system having a largely variable working width in the direction of working travel can be positioned after a repositioning transverse to the direction of working travel in the form of a driving setting in such a way that the system can be moved largely autonomously in public transport in the direction of road travel defined by the driving setting.

3. The threshing method according to claim 1, wherein:
    the grain/chaff stream is fed to the final cleaning in one or more directions for the discharge of the chaff, and the grain/chaff stream is guided during the final cleaning in respective axes of movement in or against the direction of working travel.

4. The threshing method according to claim 1, wherein:
    the collecting step comprises introducing grain of the grain/chaff stream into at least one collecting container located at a top in relation to the gathering and threshing;
    further comprising discharging chaff of the grain/chaff stream in one or more separation phases before the grain is introduced into the collecting container; and
    the one or more separation phases comprising separating the chaff from the grain using a combination of wind winnowing and sieving.

5. The threshing method according to claim 1, wherein:
    starting from a mowing path defining a cutting width with several harvesting lines, the gathering of harvested material comprises collecting harvested material in at least two partial mowing paths, the collected harvested materials being introduced into regions of separate conveying, threshing and separating paths the harvested material being further processed largely in parallel in two systems and, after the transport movement of the grain/chaff stream, the grain is separated and collected by means of the subsequent final cleaning.

6. The threshing method according to claim 5, wherein the harvested material collected in the region of the partial mowing paths is passed on in each case in two transversely merged partial flows, these two partial flows being conveyed in a single stream and each jointly fed to the threshing phase, after which two separate flows are transferred to a respective separation phase with a discharge of the admixtures being activated.

7. The threshing method according to claim 6, wherein:
    the separation phase provides an immediate discharge of residual admixtures in the form of straw and chaff, in such a way that all the admixtures picked up by the two partial mowing paths are distributed largely uniformly over a harvested area of arable land; and the grain/chaff stream is conveyed upwards into a region above an intake and a last stage of separation is carried out as the final cleaning.

8. A device for carrying out the method of claim 1, comprising:
a threshing unit operable to draw in the harvested material fed by a cutting mechanism or similar intake, and to separate straw and the grain/chaff stream;
an elevating conveyor interacting with the threshing unit in order to gather the grain/chaff stream, the elevating conveyor deflecting the grain/chaff stream and defining a conveying section directed upwards in relation to the threshing unit, in such a way that the grain/chaff stream has, at least in phases, the transport movement which has the component in the vertical direction and the component in the direction of working travel.

9. The device according to claim 8, wherein the elevating conveyor comprises one or more elevating conveyors provided on the threshing unit arranged close to the ground.

10. The device according to claim 9, wherein the one or more elevating conveyors cooperate with at least one cross conveyor.

11. The device according to claim 8, wherein:
the threshing unit comprises two threshing units operating substantially parallel next to one another;
further comprising cutting mechanism associated with the threshing units for undertaking a mowing path, in such a way that the mowing path defines a large working width.

12. The device according to claim 11, wherein the two threshing units are provided with modules for sieving, separation and collection of the grain crops, and modules for treatment and discharge of straw as well as chaff that are effective in the region of the elevating conveyor.

13. The device according to claim 11, wherein the threshing units form a two-threshing unit combination integrated as an autonomous unit in varying basic structures as a system carrier.

14. The device according to claim 8, further comprising at least one cross conveyer operable to detect an inflowing mixture in a region before the final cleaning, such that a substantially constant mixture thickness can be provided for separation in a region of the grain/chaff stream supplied from an elevation phase of the final cleaning.

15. The device according to claim 14, wherein the cross conveyor is provided at an outlet end of the elevating conveyor and has at least one auger which displaces the inflowing mixture axially in a distribution pipe, with which partial quantities of the mixture forming the grain/chaff stream are displaced in the distribution pipe are on the one hand conveyed out through an axial slot in the base and on the other hand are fed in the conveying direction to a filling level detector, wherein the filling level detector cooperates with at least one accelerating roller rotating beneath the axial slot in such a way that the material distribution is controllable by means of a change in a distance in a region of the axial slot.

16. The device according to claim 15, further comprising two accelerating rollers rotating in opposite directions provided in the region beneath the axial slot and a volume of the mixture detected between them can be changed by means of a change in distance of the two accelerating rollers which can be influenced by the filling level detector.

17. The device according to claim 15, wherein the cross conveyor has two feed inlets at ends in a region of the distribution pipe, one of the augers operable to displace the mixture towards a pipe centre, a corresponding filling curve building up in this region and being detected by the controllable filling level detector.

18. The device according to claim 15, wherein:
the threshing unit is arranged substantially centrally and in a minor-inverted manner to a longitudinal central plane of a system associated with a cutting mechanism undertaking a mowing path; and
the cross conveyor is formed by at least one cross-oscillating conveyor preparing the final cleaning, in such a way that a first phase of a sieving and sifting process with uniform conveying positions of bottom-placed grain and top chaff can be achieved.

19. The device according to claim 18, wherein the at least one cross-oscillating conveyer comprises two-layer conveying layers which can be influenced by means of at least one transverse air flow in such a way that an effective phase of air separation can be introduced in a region above at least one separation surface.

20. The device according to claim 19, wherein the respective cross-oscillating conveyors co-operate with at least one catch plate arranged beneath them, from which the conveying layers can be displaced towards at least one lower separating surface spaced apart by a fall level and separation by means of air separation is provided at least in the region of this fall level such that largely clean grain passes via a second fall level into a lower sieve box.

21. The threshing method according to claim 1, wherein:
the system includes a functional frame having a U-shape.

22. The threshing method according to claim 1, wherein:
the system includes a functional frame having a base frame extending in the direction of road travel and a side frame extending in the direction of working travel from an edge of the base frame.

23. The threshing method according to claim 22, wherein:
a length of the base frame in the direction of road travel is greater than a length of the side frame in the direction of working travel.

24. The threshing method according to claim 1, wherein:
the final cleaning is performed at a cleaning location above a threshing location where the threshing phase is performed.

* * * * *